Sept. 7, 1965  D. S. SCHWARTZ  3,205,464
FLEXIBLE STRAIN TRANSDUCER
Filed April 27, 1964  2 Sheets-Sheet 1
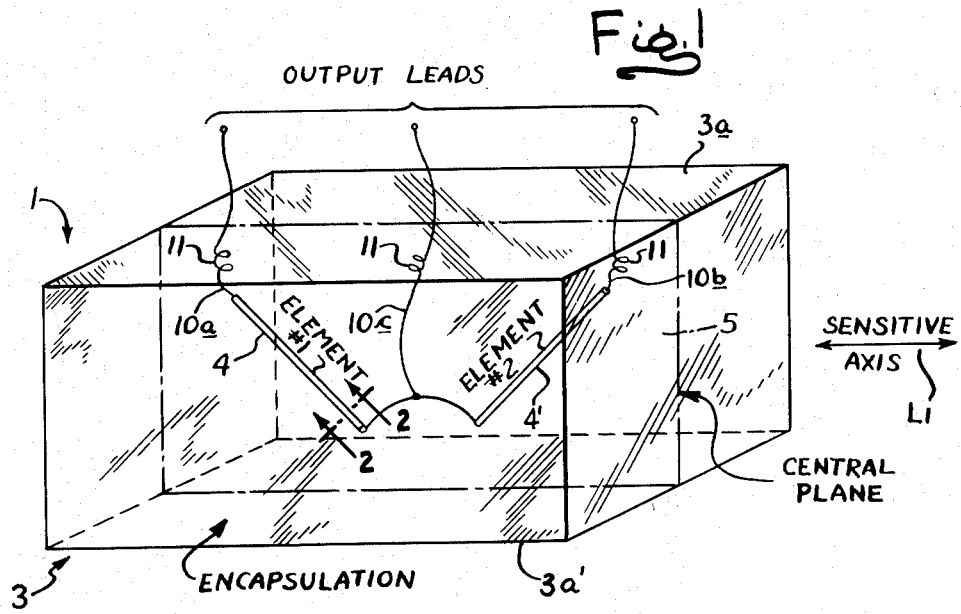
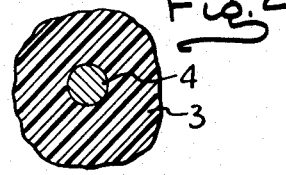
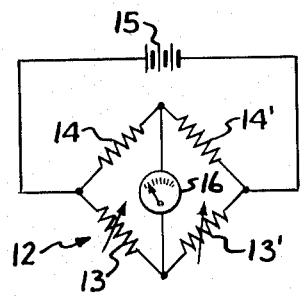
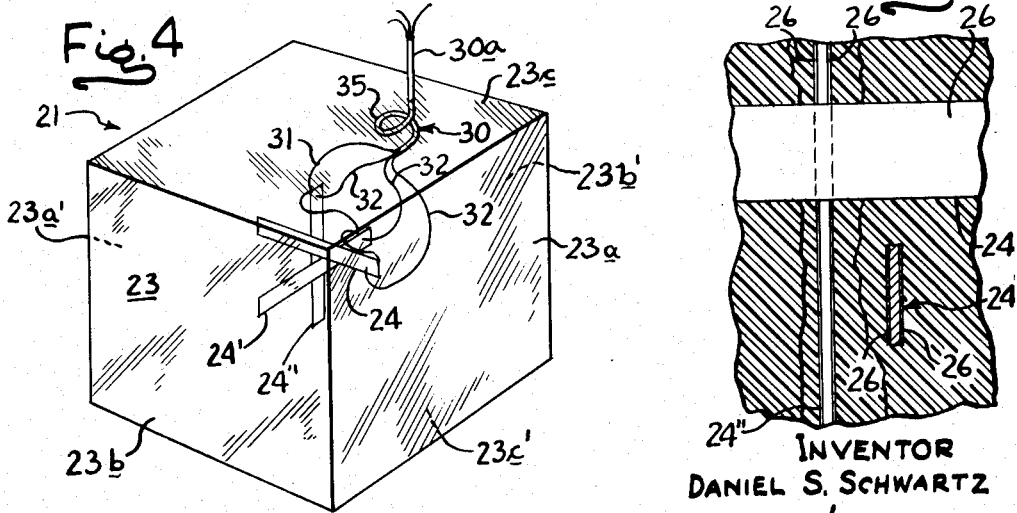
INVENTOR
DANIEL S. SCHWARTZ
by Wallenstein, Spangenberg & Hattis
ATTYS.

Sept. 7, 1965  D. S. SCHWARTZ  3,205,464
FLEXIBLE STRAIN TRANSDUCER
Filed April 27, 1964  2 Sheets-Sheet 2

INVENTOR
DANIEL S. SCHWARTZ
by: Wallenstein, Spangenberg
& Hattis
ATTYS.

United States Patent Office 3,205,464
Patented Sept. 7, 1965

1

3,205,464
FLEXIBLE STRAIN TRANSDUCER
Daniel S. Schwartz, Nixon, N.J., assignor to Gulton Industries, Inc., Metuchen, N.J., a corporation of New Jersey
Filed Apr. 27, 1964, Ser. No. 362,637
7 Claims. (Cl. 338—2)

This invention relates to strain measuring transducers which have particular utility in the measuring of extremely large strains.

In recent years piezo-resistive and piezo-electric sensing materials have become of increasing importance in accelerometers, flexible strain measuring transducer devices and the like. Gauge factors for these materials are of much higher magnitude than those obtainable with more conventional metal strain gauge materials. The piezo-resistive and piezo-electric materials often have strain limitations which greatly limit their applicability for measuring extremely high strains as, for example, strains which cause elongations thereof in the neighborhood of 10% or more. Strains of this magnitude will usually exceed the elastic limit of the materials and render them unusable thereafter as strain measuring materials.

There has been a need for many years for strain gauge devices which are useful in environments where the strains applied will normally exceed the elastic limit of the sensing materials. The present invention offers a very simple, unique and highly advantageous solution to this problem.

One of the objects of the invention is to provide a rugged and reliable strain measuring transducer which preferably (although not necessarily) uses piezo-resistive and piezo-electric materials and wherein the device can withstand and operate properly under strains which would exceed the elastic limit of the sensing materials used in the normal or usual manner.

Another object of the invention is to provide a strain measuring transducer as described which is capable of measuring exceedingly high strains that exist, for example, in solid propellants used in various rocket and missile engines.

A further object of the invention is to provide a strain measuring transducer as described which can be imbedded within a body of material whose strains are to be measured, such as the propellant application referred to above, without adversely affecting to any significant degree the acoustic or stress wave patterns which pass through the body in which the device is imbedded, so that it becomes an accurate measure of the strains occurring in the body under normal environmental conditions where the strain measuring transducer is not present in the body.

A further object of the present invention is to provide a strain measuring transducer as described which is of simple, economical construction, is rugged, and gives an accurate indication of the strain conditions of the body with which it is used.

In accordance with a feature of the present invention preferably relatively thin wires or rods of strain gauge sensing material are encapsulated in a material having a substantially greater stretchability or flexibility than the sensing material such as a rubber, or a rubber-like material to form a body of predetermined size. The mass of material in which the sensing material is imbedded is substantial, so as to form a compressible block of such material of substantial thickness relative to the dimensions of the sensing material, so that the strains applied to the block will be substantially reduced in magnitude by the time their effect is felt by the strain measuring material involved. Thus, the ends of the wires and rods are spaced a substantial distance (i.e. many times the thickness of the rods) from the strain receiving surfaces of the block. In effect, the block acts as a cushion for the strains so that, for example, a 10% strain applied to the block as a whole will strain the strain measuring material less than 1%, such as 1/10 of 1%. The resultant strain reduction in the strain sensing material is not only important because it greatly increases the strain range with which the device can be used, but it also improves the linearity and hysteresis characteristics thereof and reduces creep effects. The resulting encapsulated transducer is then calibrated by applying known stresses or strains to the surfaces of the transducer and recording the response of the encapsulated strain sensing material to each test stress or strain.

In accordance with another aspect of the invention, where the encapsulated transducer is to be imbedded in a material whose strains are to be measured, the characteristics of the encapsulation material is selected so that, most advantageously, it will have a Young's modulus of elasticity the same order of magnitude as the material in the body in which it is to be imbedded for strain measuring purposes, so that the stress patterns occurring in the body will not be disturbed much by the presence of the measuring device therein. If it is not convenient to use an encapsulation material having a Young's modulus of elasticity similar to the material in which it is to be imbedded, then the encapsulated material is selected with a Young's modulus of elasticity which is less than that of the material to minimize the effect of the mismatch involved.

In accordance with another aspect of the invention, to provide for the proper matching of the Young's modulus of elasticity of the encapsulation material with the body of material in which the strain measuring device is to be used, without disturbing the desired stretchability of the material, it is contemplated that the encapsulation material be filled or loaded with rigid particles or stiffening bars. For example, dispersing aluminum, potassium chloride or sodium chloride particles in a rubbery encapsulation material will increase the Young's modulus of elasticity of the encapsulation block without much effect on its stretchability.

The above and other objects, advantages and features of the invention will become apparent upon making reference to the specification to follow, the claims and the drawings wherein:

FIG. 1 is a perspective view of one form of the present invention constituting a shear strain transducer;

FIG. 2 is a fragmentary enlarged section through the transducer of FIG. 1;

FIG. 3 illustrates a Wheatstone bridge circuit including as a pair of arms thereof a pair of strain sensing elements forming part of the transducer of FIG. 1;

FIG. 4 is a perspective view of another form of the invention used as a three dimensional strain measuring transducer;

FIG. 5 is a fragmentary enlarged section through one portion of the transducer of FIG. 4;

Figure 6:
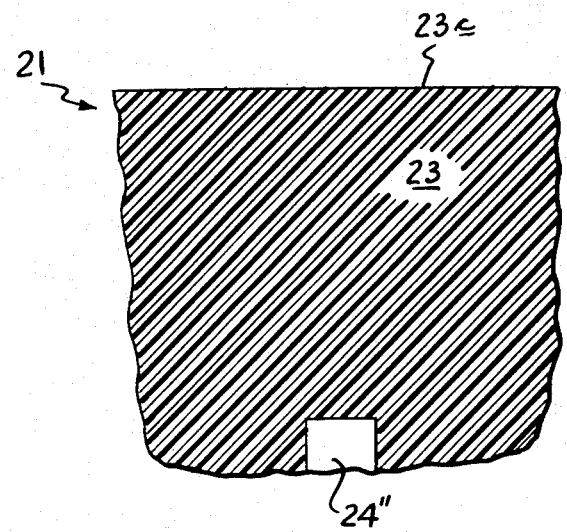
FIG. 6 is a fragmentary enlarged section through another portion of the transducer of FIG. 4.

Referring now to the embodiment of the invention shown in FIGS. 1 and 2, the transducer there shown and designated by reference numeral 1 is designated to provide a measure of shear strain applied between a pair of spaced parallel faces 3a and 3a' of a solid block 3 of material constituting a transducer body. In other words, the transducer provides a measure of the distance that one of the faces 3a shifts with respect to the other face 3a' in a direction parallel to the planes thereof. Completely imbedded in the block 3 is a pair of strain sensing wires or rods 4 and 4' which extend at an angle to one another and to the faces 3a and 3a' of the block 3. The strain sensing wires or rods 4 and 4' are located in a plane 5 which is preferably a medial plane extending at right angles to the block faces 3a and 3a' and are spaced apart in a direction coinciding with a sensitive axis line L1 which is parallel to the relative direction of movement of block faces 3a and 3a' under the shear strains to be measured by the transducers. Thus, movement of the block face 3a to the right with respect to the face 3a' will cause the wire or rod 4 to be lengthened and the wire or rod 4' to be shortened and movement of the block face 3a to the left with respect to the face 3a' will cause the wire or rod 4 to be shortened and the wire 4' to be lengthened. Movement of the block faces 3a and 3a' in directions not parallel to the sensitive axis line L1 will have the same effect on the wires or rods 4–4'. The strain sensing wires or rods 4 and 4' have a variable electrical characteristic which varies in one direction when they are lengthened and varies in the opposite direction when they are shortened. Thus, an increase of the electrical characteristic of one of the wires or rods 4 and a decrease in the electrical characteristic of the other wire or rod 4' will indicate a shear strain in one direction parallel to the sensitive axis line L1 and a decrease in the electrical characteristic of the wire or rod 4 and an increase in the electrical characteristic of the wire or rod 4' will indicate a shear strain in the opposite direction parallel to the sensitive axis line L1.

The strain sensing wires or rods 4–4' are preferably made of a piezo-resistive material. Such materials are commonly composed mainly of semi-conducting materials whose resistance changes as a function of the applied stress. Piezo-resistance materials possess the advantage of being able to measure static as well as dynamic stresses. The gauge factors for these piezo-resistive materials are much higher than those obtainable with metal strain gauge materials (e.g. 20 to 50 times higher). These materials generally exhibit an increase in resistance as their length increases and a decrease in resistance as their length decreases. A good example of a piezo-electric material usable in the form of the invention now being described is a P-type silicon crystal cut along its 1—1—1 axis so that this axis coincides with the length of each wire or rod 4 and 4'.

One of the features of the present invention is that the block 3 is made of a rubber or rubber-like material (i.e. it is a highly resilient, compressible and stretchable) and the ends of the strain sensing wires or rods 4 and 4' are spaced appreciably from the outer faces of the block 3, so that the strain applied to the wires or rods 4 and 4' is much less than the strain applied to the faces 3 and 3a'. This permits the use of the highly sensitive piezo-resistive and other materials having limited strain capabilities in environments where the strains are of such substantial magnitude that the elastic limit of the strain sensing wires or rods 4 and 4' would be exceeded if applied directly thereto.

The resiliency and flexibility of the block 3 enables the block faces 3a and 3a' readily to follow the strain applied thereto. It is also important that the transducer not affect the stress and strain pattern in the body in which the transducer is placed. To this end, the Young's modulus of elasticity of the solid resilient block 3 should match the Young's modulus of elasticity of the surrounding medium in which it is placed. Various standard materials are available with moduli up to about $4 \times 10^5$ p.s.i. Higher apparent moduli may be obtained without disturbing the stretchability of the material by adding, for example, particles of aluminum or the like to the mix from which the solid resilient block 3 is formed.

The block 3 may be made from a polysiloxane polymer, such as Dow Corning silastic silicone rubber RTV 501 which has a Young's modulus of elasticity similar to that of propellants used in rocket engines and the like. One exemplary transducer found especially satisfactory has a length measured in the direction of the spacing of the strain sensing wires or rods 4 and 4' of about ½" and a square cross section of ¼" x ¼". The ends of the strain sensing wires or rods 4 and 4' were spaced about ⅛" from the parallel faces 3a and 3a'.

In the case where the strain sensing wires or rods 4 and 4' are piezo-resistive rods, conductors 10a–10b are respectively connected to the outer ends of the rods 4 and 4' and a common conductor 10c is connected to the inner ends of the strain sensing rods 4 and 4'. To minimize the coupling of strains to the rods 4 and 4' through the conductors 10a, 10b and 10c, the rods are preferably made from extremely thin wire, for example, wire having a diameter of .006 inch more or less, and these wires are either separately brought out of the block 3 as illustrated or are carried in a common cable which passes to the outside of the block 3. To this same end these conductors are preferably formed into coils 11 for stress relief at one or more points along the length thereof.

The piezo-resistive wiers or rods 4 and 4' may be connected into a Wheatstone bridge circuit 12 as illustrated in FIG. 3. The strain sensing wires or rods are placed in adjacent arms 13–13' of the bridge circuit. Resistors 14–14' form the other arms of the bridge circuit. A source of voltage 15 is connected to the input terminals of the bridge circuit and a voltage sensing device 16 is connected to the output terminals of the bridge circuit. It is apparent that when the resistance values of the strain sensing wires or rods 4 and 4' vary in opposite directions, the bridge will become unbalanced if the bridge circuit was initially balanced before application of strain to the transducer 1.

Refer now to the embodiment of the invention shown in FIGS. 4 and 5 which illustrate a three dimensional strain measuring transducer 21 utilizing three piezo-electric strain sensing elements 24, 24' and 24". The transducer 21 includes a solid resilient cubical block 23 which is preferably made of the same material as the block 3 in the embodiment shown in FIG. 1. Thus, it preferably has a Young's modulus of elasticity to match the surrounding medium in which it is placed. As previously indicated, the silicone rubber material identified above forms a good material when the transducer is imbedded in a variety of propellants used in rocket engines and the like.

Imbedded and centered within the block 23 are the piezo-electric elements 24, 24' and 24". These elements are illustrated as thin elongated rectangular bars whose longitudinal axis are respectively parallel to the three pairs of orthogonal faces 23a–23a', 23b–23b', and 23c–23c' of the cubical block 23. The bars 24, 24' and 24" are preferably made of a polarized multicrystalline piezo-electric ceramic, such as barium titanate, and each has a pair of conductive coatings 26 on the opposite side faces thereof constituting electrodes for the piezo-electric bar. The longitudinal axis of each elongated piezo-electric bar is arranged in the direction of one of the cube axis of the block 23. When a compressive force is applied between the block faces 23a–23a', the resulting dynamic compression of the piezo-electric bar 24 results in the generation of a voltage across the electrodes 26—26 thereof of opposite polarity to the polarization thereof. A tensile stress applied across the block faces 23a–23a' will stretch the bar 24 and produce a voltage across the electrodes 26—26 thereof of the same polarity as the polarization thereof. Compression or tension applied to the other cube face pairs 23b–23b' and 23c–23c' will produce similar voltages across the electrodes of the piezo-electric bars 24' and 24".

In one exemplary transducer, the bars 24, 24' and 24" were approximately ¼" in length, ⅟₃₆" wide and 0.005" thick. The cubical resilient block 23 was a ½" cube so that the ends of each of the piezo-electric bars were spaced approximately ⅛″ from the associated faces of the cube. Thus, the strains applied to the piezo-electric bars 24, 24′ and 24″ will be materially less than that applied to the outer faces of the block 23 due to the compressibility and stretchability of the material out of which the block 23 is made. The piezo-electric bars will produce significant voltages only for strains applied in the direction of their length. Thus, by measuring the voltage outputs of the three piezo-electric bars 24, 24′ and 24″, the direction of the strain applied to the transducer 21 can be readily determined.

As illustrated in FIG. 4, a cable 30 extends from the outside of the transducer to the inside thereof to make electrical connection with the various electrodes 26 of the piezo-electric bars. The cable 30 may have a solid outer conductive sheath 30a to which one of the electrodes 26 of each of the piezo-electric bars is connected by a common thin wire 31. The other electrodes of the piezo-electric elements are shown connected by separate thin wires 32 extending into and through the cable 30, the various wires being coated with a suitable insulating material so that the wires are insulated from one another. The cable 30 is desirably as small as possible and is coiled at one or more points line 35 along its length to minimize coupling of strains through the cable to the piezo-electric bars. The cable 30 may have a 0.20″ outer diameter to accommodate three insulated wires therein have a diameter of approximately .006″.

Figure 7:
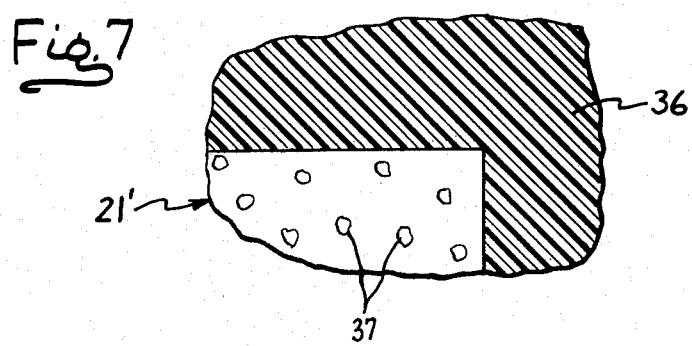
FIG. 7 illustrates an enlarged fragmentary section through a portion of a test body with a transducer of the invention imbedded therein, the resilient block of the transducer having stiffening particles dispersed therein for controlling the Young's Modulus of elasticity thereof.

The transducers 1 and 21 in FIGS. 1 and 4 are calibrated with known strains prior to their use in the field so that electrical measurements obtained from the transducer can be related to specific strains. As previously indicated, the strain reduction afforded by the compressible and stretchable resilient material out of which the blocks 3 and 23 are made enable the transducers to be used at strain levels which greatly exceed the elastic limits of the strain sensing materials used therein. Also, by the proper selection of the material out of which the blocks 3 and 23 are made or by adding filler particles or the like, the Young's modulus of elasticity thereof can be matched to the modulus of a surrounding body in which they may be placed, so that the transducers will not significantly modify the strain characteristics of the body whose strains are being measured. FIG. 7 shows a test body 36 with a transducer 21′ imbedded therein and particles 37 dispersed through the resilient block 25 so that the Young's Modulus of elasticity thereof matches that of the test body.

It should be understood that numerous modifications may be made in the forms of the invention illustrated above without deviating from the broader aspects of the invention. For example, although the use of wire or rod-like strain sensing elements is highly desirable, the present invention envisions in its broadest aspects the use of other physical forms of strain sensing elements, such as disc or plate shaped elements. Also, the present invention is applicable to a multi-directional transducer where the encapsulation block would be a spherically-shaped rubbery body and the strain sensing elements are oriented in a multiplicity of directions rather than just three directions as in the case of the form of the invention shown in FIG. 4.

I claim:
1. A strain measuring transducer comprising a solid block of compressible and stretchable resilient rubber-like material having a definite predetermined size and shape in the absence of stress applied thereto, at least one elongated strain sensing element imbedded in said resilient block and having an electrical characteristic which varies with the strain applied thereto, said resilient block having at least one strain-receiving surface which receives a force to be sensed by the strain sensing element which is stressed thereby, the ends of said strain sensing element being spaced a distance from the strain-receiving surfaces of the block which is many times the thickness of said strain sensing element, wherein a given strain applied to the outside of the block will be applied in reduced degree to said strain sensing element which is a fraction of the strain applied to the block, and conductors extending from the strain sensing element to the outside of the block, to couple the variable electrical characteristic thereof to the outside of the block.

2. The strain measuring transducer of claim 1 wherein said strain sensing element comprises straight rods which produce a varying electrical characteristic under length changing stresses, said rods being aligned in different directions to vary in length in different degrees depending on the direction of the strain applied thereto.

3. In a test body in which is imbedded a strain measuring transducer, the improvement wherein said strain measuring transducer comprising a solid block of compressible and stretchable resilient rubber-like material having a definite predetermined size and shape in the absence of stress applied thereto, said resilient block having a Young's modulus of elasticity of the same order of magnitude as the portion of the test body surrounding the same to minimize interference with the stress patterns therein at least one elongated, strain sensing element imbedded in said resilient block and having an electrical characteristic which varies with the strain applied thereto, said resilient block having at least one strain-receiving surface which receives a force to be sensed by the strain sensing element which is stressed thereby, the ends of said strain sensing element being spaced a distance from the strain receiving surfaces of the block which is many times the thickness of said strain sensing element, wherein a given strain applied to the outside of the block will be applied in reduced degree to said strain sensing element which is a fraction of the strain applied to the block, and conductors extending from the strain sensing element to the outside of the test body, to couple the variable electrical characteristic thereof to the outside of the block.

4. The strain measuring transducer of claim 3 wherein said block of resilient material includes spaces distributed stiffening elements which increase the apparent Young's modulus of elasticity without substantially affecting the stretchability of the material.

5. A strain measuring transducer comprising a solid block of compressible and stretchable resilient rubber-like material having a pair of spaced faces to which shear strains are to be imparted to shift one of the faces relative to the other in a direction parallel thereto, a pair of strain sensing rods positioned in a plane at right angles to said pair of spaced block faces, and having electrical characteristics which vary with a change in length thereof, said strain sensing rods extending at an angle with respect to one another and to said spaced block faces and spaced from one another in a direction wherein said shifting of one of said block faces with respect to the other will lengthen one of said rods and shorten the other, the ends of said strain sensing rods being spaced a distance from said block faces which is many times the thickness of the rods, wherein a given shear strain applied thereto is applied in reduced degree to said rods which is a fraction of the strain applied to the block faces, and conductors extending from the ends of said strain sensing rods to the outside of the block to couple the variable electrical characteristic thereof to the outside of the block.

6. A strain measuring transducer comprising a solid block of compressible and stretchable resilient rubber-like material, a number of strain sensing elements with strain sensing axes oriented in different directions, said strain sensing elements having an electrical characteristic which varies with the change of the strains applied along their strain sensing axes, the ends of said resilient block having at least one strain-receiving surface which receives a force to be sensed by the strain sensing elements which are stressed thereby, said strain sensing elements being spaced a distance from the outer surfaces of said block which is many times the thickness of the strain sensing elements, wherein a given strain applied to the outside of the block is applied in reduced degree to said strain sensing elements which is a fraction of the strain applied to the block, and conductors standing from the strain sensing elements to the outside of the block to couple the variable electrical characteristic thereof to the outside of the block.

7. A strain measuring transducer comprising a solid cubical block of compressible and stretchable resilient rubber-like material, three rods forming strain sensing elements centered within said cubical block and respectively extending parallel to the three axes of the block, said strain sensing rods having an electrical characteristic which varies with the change of length thereof, said resilient block having at least one strain-receiving surface which receives a force to be sensed by the strain sensing rods which are stressed thereby, the ends of said strain sensing rods being spaced a distance from the outer surface of said block which is many times the thickness of the rods wherein a given strain applied to the outside of the block is applied in reduced degree to said rods which is a fraction of the strain applied to the block, and conductors standing from the ends of said rods to the outside of the block to couple the variable electrical characteristic thereof to the outside of the block.

References Cited by the Examiner

UNITED STATES PATENTS

| | | | |
|---|---|---|---|
| 2,429,087 | 10/47 | Aughtie et al. | 338—2 |
| 2,734,978 | 2/56 | Bulgin | 338—2 |
| 2,913,693 | 11/59 | Yao et al. | 338—6 |
| 2,935,709 | 5/60 | Paine | 338—2 |
| 3,074,175 | 1/63 | Ludlam | 338—6 |

RICHARD M. WOOD, *Primary Examiner.*